(12) United States Patent
Smetz

(10) Patent No.: US 8,220,244 B2
(45) Date of Patent: Jul. 17, 2012

(54) COMPONENT FOR SHORTENING CHAINS

(75) Inventor: Reinhard Smetz, Oettingen (DE)

(73) Assignee: RUD Ketten Rieger & Dietz GmbH u. Co. KG, Aalen-Unterkochen (DE)

( * ) Notice: Subject to any disclaimer, the term of this patent is extended or adjusted under 35 U.S.C. 154(b) by 629 days.

(21) Appl. No.: 11/919,153

(22) PCT Filed: Apr. 12, 2006

(86) PCT No.: PCT/EP2006/003342
§ 371 (c)(1),
(2), (4) Date: Sep. 18, 2009

(87) PCT Pub. No.: WO2006/114201
PCT Pub. Date: Nov. 2, 2006

(65) Prior Publication Data
US 2010/0011737 A1    Jan. 21, 2010

(30) Foreign Application Priority Data
Apr. 26, 2005 (DE) .......................... 10 2005 019 641

(51) Int. Cl.
*F16G 17/00* (2006.01)
*F16G 15/00* (2006.01)
(52) U.S. Cl. ............... 59/93; 59/78; 24/116 R; 294/82.1
(58) Field of Classification Search ................. 59/78, 93; 24/116 R; 294/82.1
See application file for complete search history.

(56) References Cited

U.S. PATENT DOCUMENTS

| 1,889,633 | A | * | 11/1932 | Butterworth ................ 24/116 R |
| 4,249,369 | A | * | 2/1981 | Tsuzuki et al. ................. 57/263 |
| 5,724,804 | A | * | 3/1998 | Smetz ................. 59/93 |
| 5,732,545 | A | * | 3/1998 | Fredriksson ................. 59/93 |
| 5,906,032 | A |   | 5/1999 | Fredriksson et al. |
| 6,568,165 | B2 | * | 5/2003 | Smetz ................. 59/93 |
| 6,874,206 | B2 | * | 4/2005 | Smetz ................. 24/116 R |
| 7,269,937 | B2 | * | 9/2007 | Fredriksson ................. 59/93 |

FOREIGN PATENT DOCUMENTS

| DE | 2947871 A1 | 9/1981 |
| DE | 695 09 772 T2 | 9/1999 |
| DE | 202 05 316 U1 | 8/2002 |
| DE | 101 49 340 A1 | 4/2003 |
| GB | 2 138 533 A | 10/1984 |
| WO | WO 97/23405 A | 7/1997 |
| WO | WO 2004/087554 A | 10/2004 |

\* cited by examiner

*Primary Examiner* — David Jones
(74) *Attorney, Agent, or Firm* — Mark P. Stone

(57) ABSTRACT

In a component for shortening a chain (12), said component being provided with a connector bow (2) that can be hung into a connector body (6) and with a shortening organ (7), a safety bolt, which is simultaneously formed as a retainer pin (3) for the end link (11) of the chain (12) to be shortened, serves to secure the position of the connector bow (2) in the connector body (6).

17 Claims, 6 Drawing Sheets

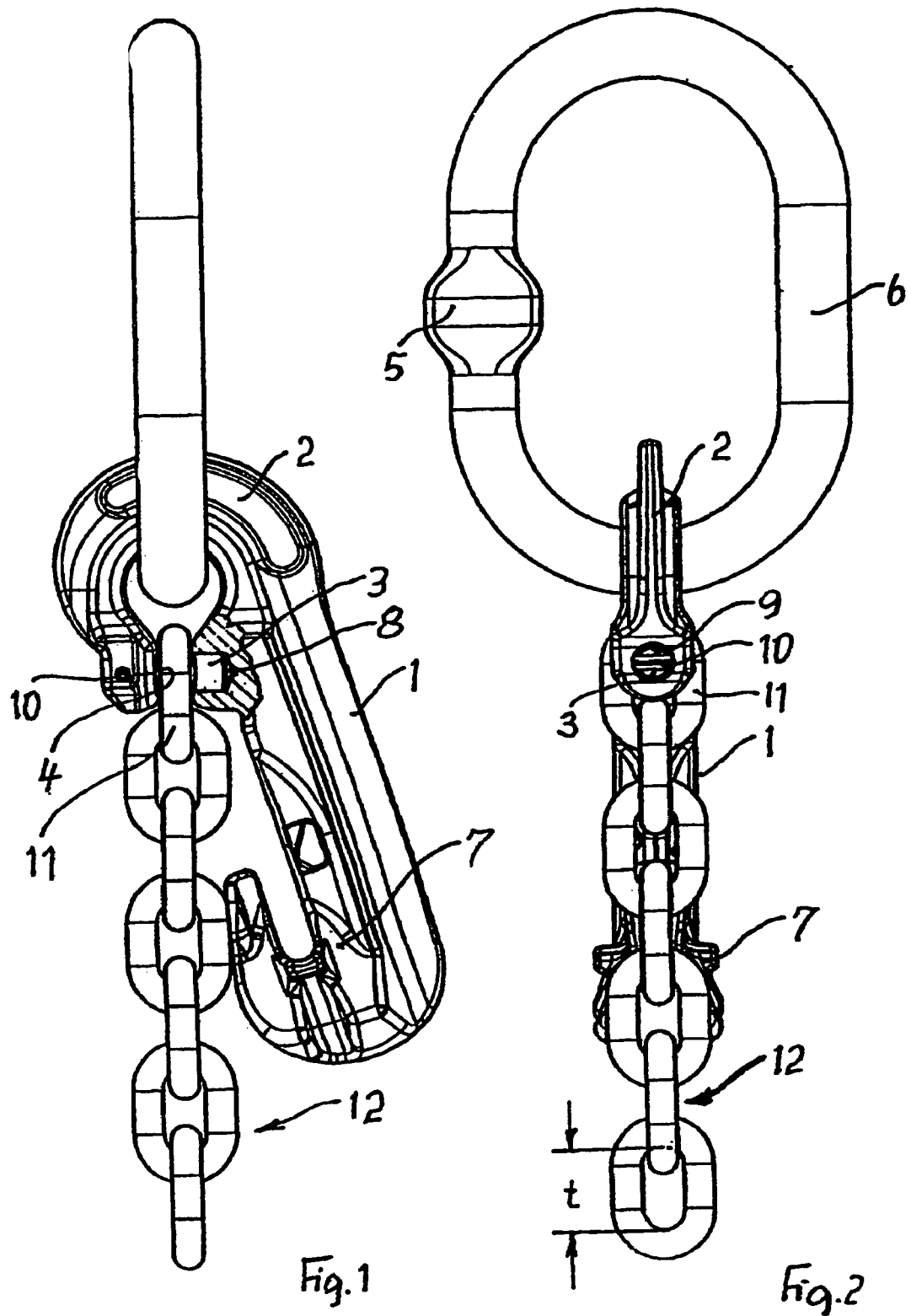

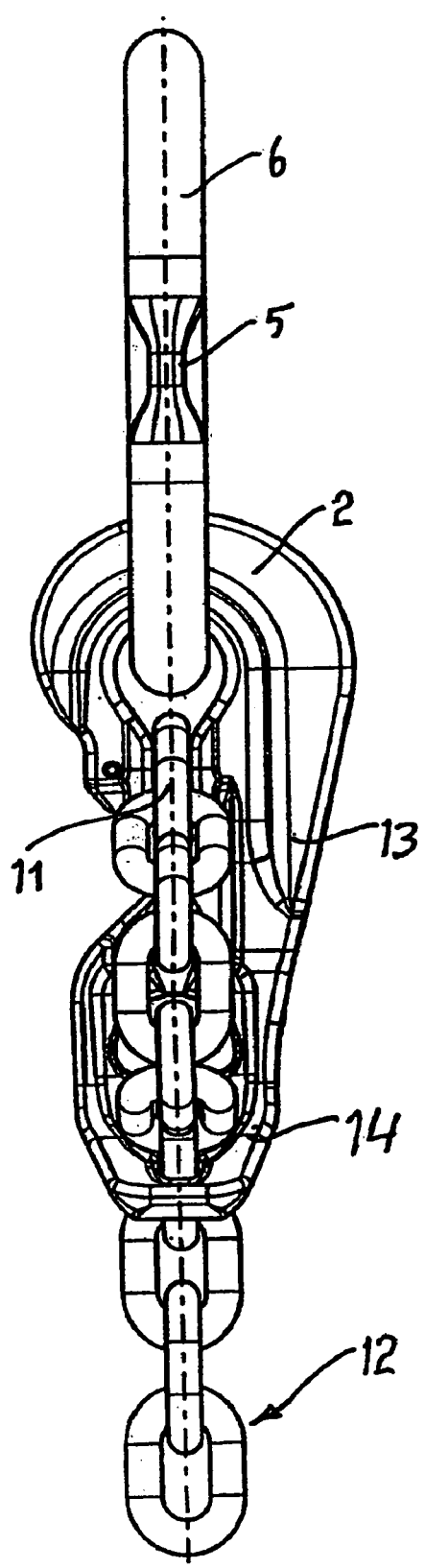
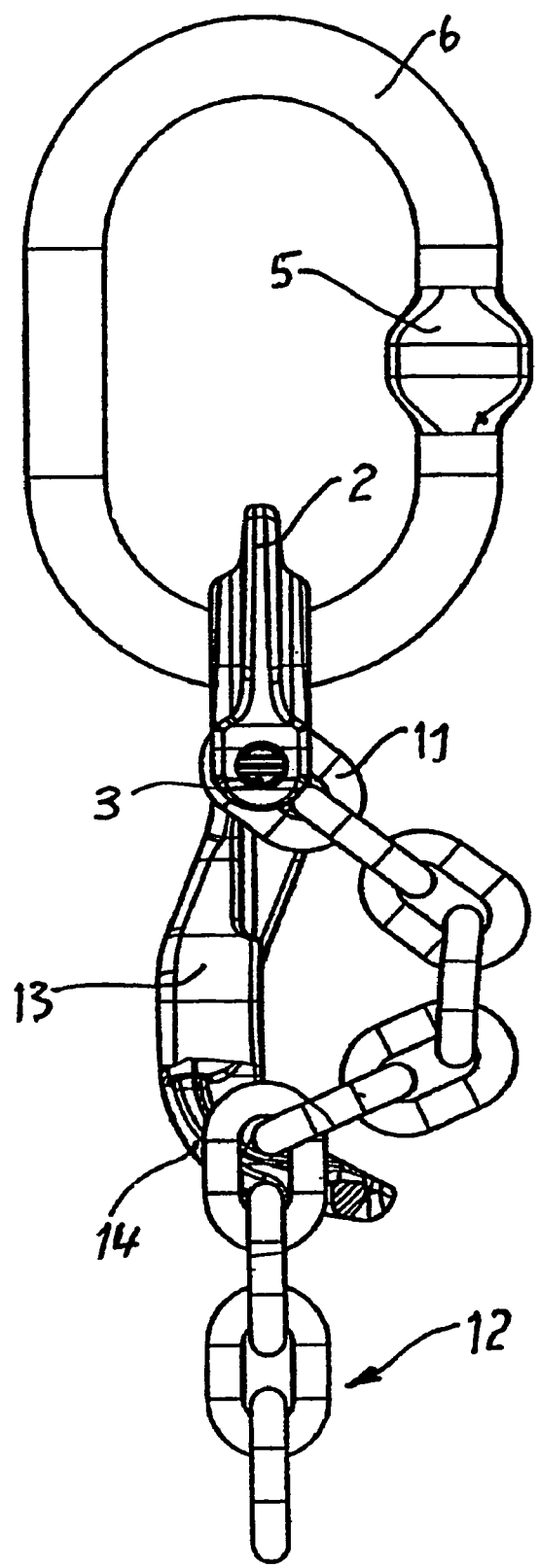
Fig. 7
Fig. 8

COMPONENT FOR SHORTENING CHAINS

TECHNICAL AREA

The invention relates to a component for shortening a chain, particularly one made of round steel links, said component being provided with a connector bow which can be hung into a connector body, which is preferably provided with a flat portion, said connector bow having an insertion opening that can be closed by a safety bolt, and said component having, on the end lying below the connector bow, a shortening member for shortening the chain, whose end link is captively connected to the component with the help of a retainer pin.

STATE OF THE ART

A component of the preceding type is known from FIGS. 5 and 6 of WO 97/23405. In the known design, the safety bolt is arranged in the area of the insertion opening of the connector bow in such a manner that it can move against the action of a spring while the retainer pin for the end link of the chain to be shortened is, together with the shortening member, located, at a distance from the opening of the connector bow, at the lower end of the component, and the shortening organ and the bore holes of the retainer pin held in place on both sides lie in a common plane that runs roughly perpendicular to the longitudinal axis of the component.

The known component is not fully satisfactory, because the minimum value by which the chain can be shortened is comparably high, due to the position of the retainer pin and the shortening member. The reason for this lies in the fact that the number of chain links needed for forming the chain loop between the end link of the chain and the chain link that is closest to the end link and that can be hung into the shortening member is comparably high due to the chain path that results from the position of the retainer pin and the shortening member.

DESCRIPTION OF THE INVENTION

The object of the invention is to create a component of the type being considered, whereby said component makes it possible to shorten a chain by smaller amounts than is possible with the known component. This object is solved according to the invention in that the safety bolt is formed as a retainer pin for the end link of the chain, said retainer pin being secured against moving.

Due to the position of the retainer pin above the shortening member, the retaining pin taking on a securing function and, so to speak, forming a combination bolt, small shortening lengths can be realized, which is particularly desirable in the case of multiple-strand suspension gear. It furthermore proves to be advantageous that the manufacturing effort for the component is reduced due to the omission of a bolt and its support. Ultimately the handling of the component during shortening is also made easier, because, unlike in the case of the known component, a partial twining of the shortening member through the chain is made superfluous.

Further details and features of the invention result from the following description of a number of embodiments and from the dependent claims.

BRIEF DESCRIPTION OF THE DRAWINGS

Shown are:

FIG. 1 the front view of a component formed in the manner of a shortening hook with the non-shortened chain FIG. 2 the side view of the component according to FIG. 1

FIG. 7 the front view of the component according to FIGS. 5 and 6, with a minimally shortened chain FIG. 8 the side view of the component according to FIG. 7

WAYS TO EXECUTE THE INVENTION

Figure 3:
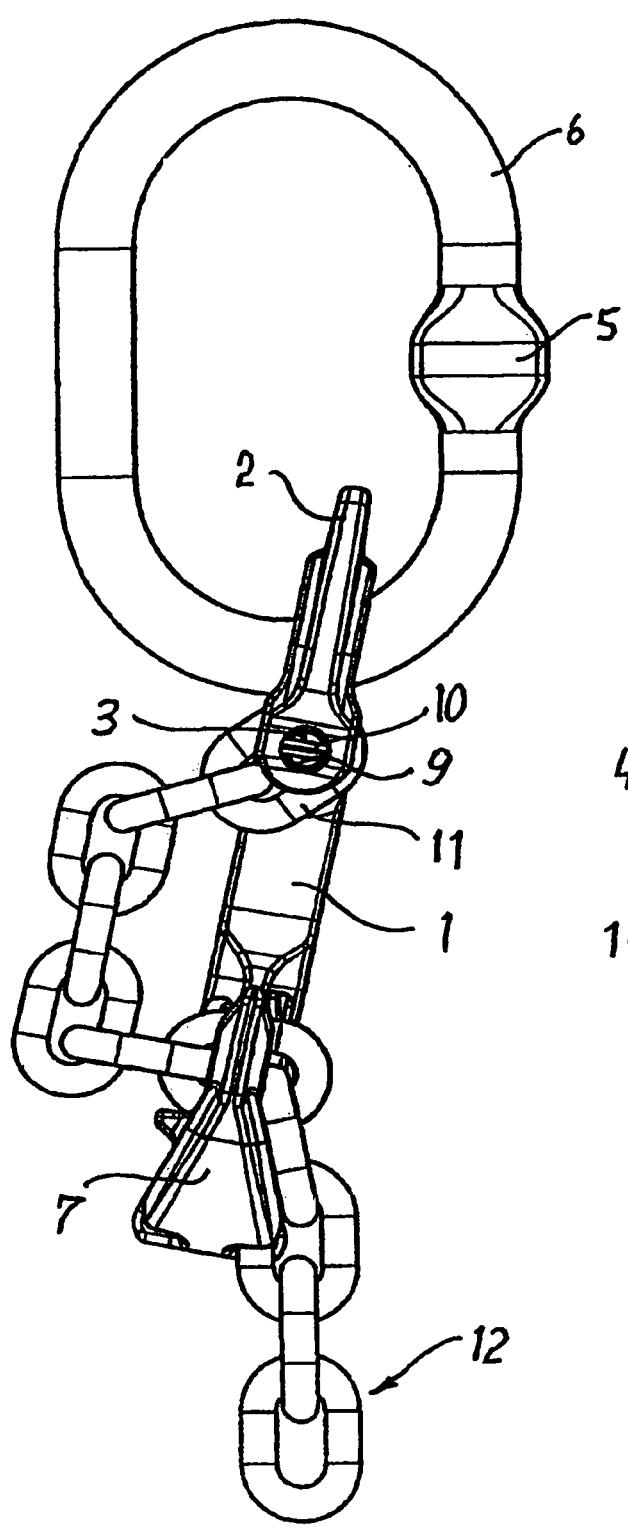
FIG. 3 the front view of the component according to FIGS. 1 and 2, with a minimally shortened chain FIG. 4 the side view of the component according to FIG. 3
Figure 4:
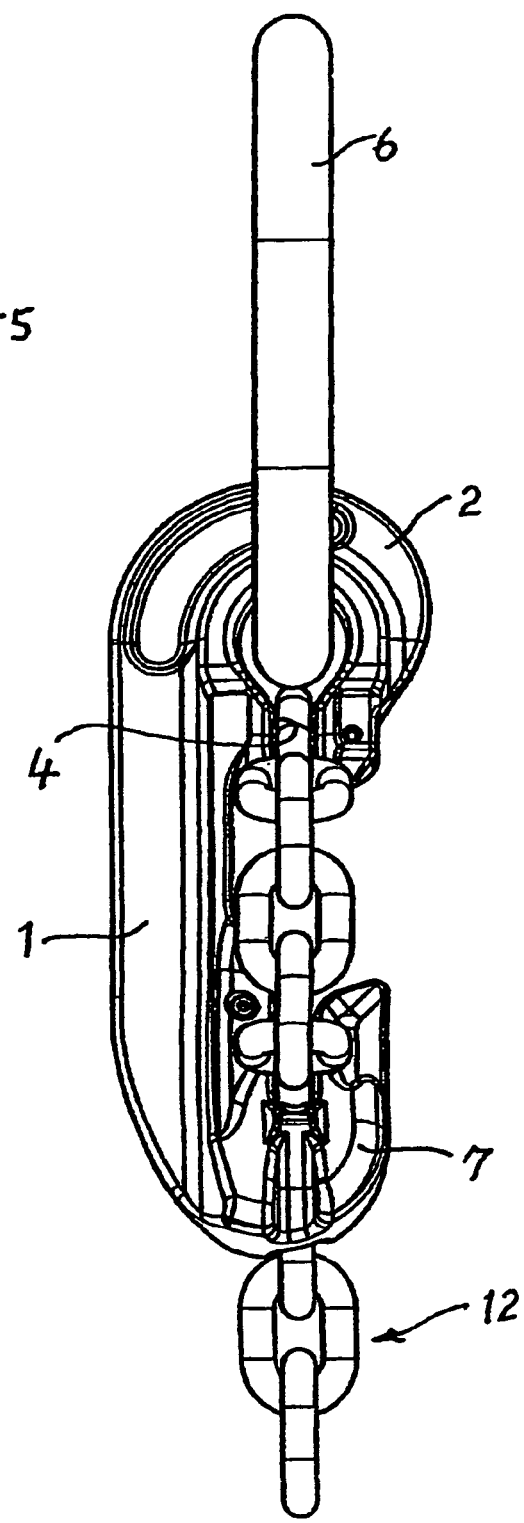
Figure 5:
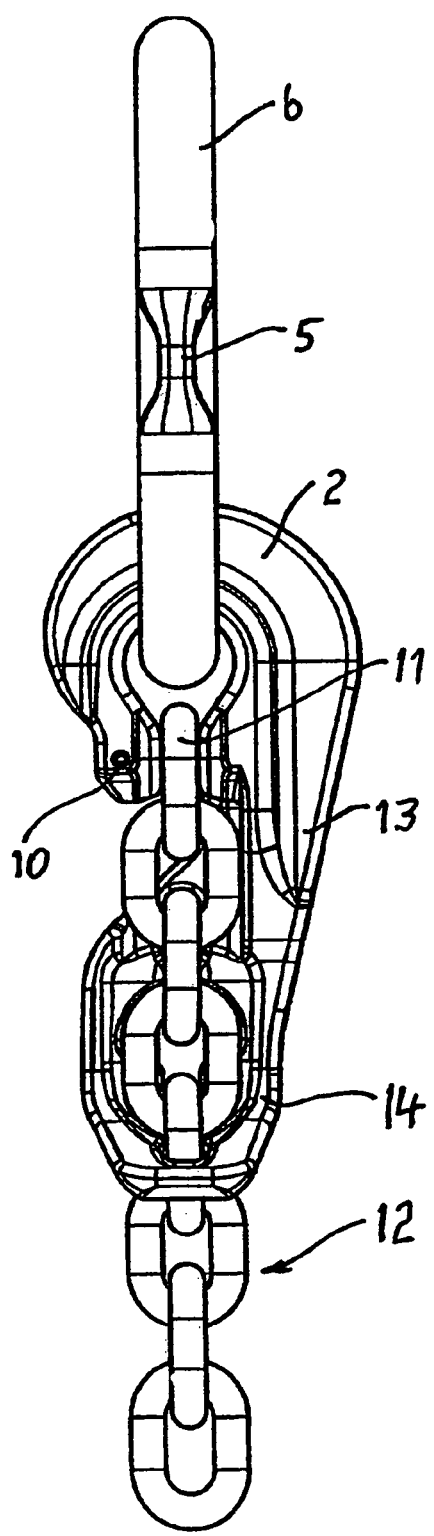
FIG. 5 the front view of a component formed in the manner of a shortening bracket with a non-shortened chain FIG. 6 the side view of the component according to FIG. 5
Figure 6:
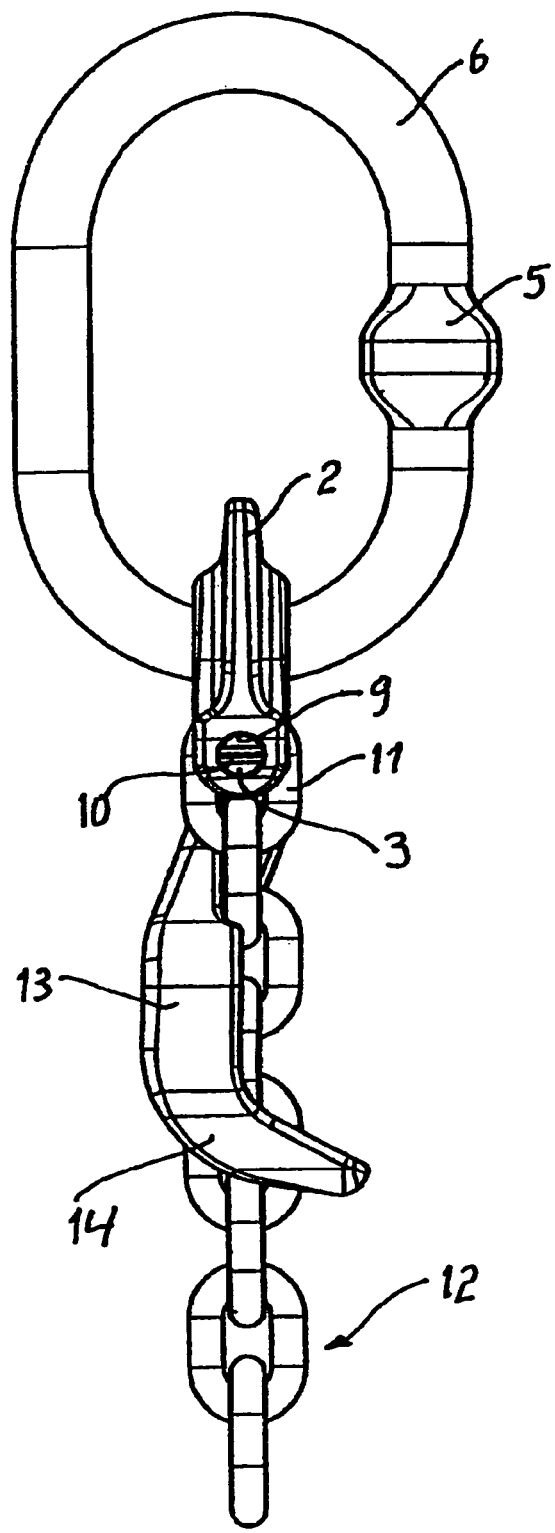
Figure 9:
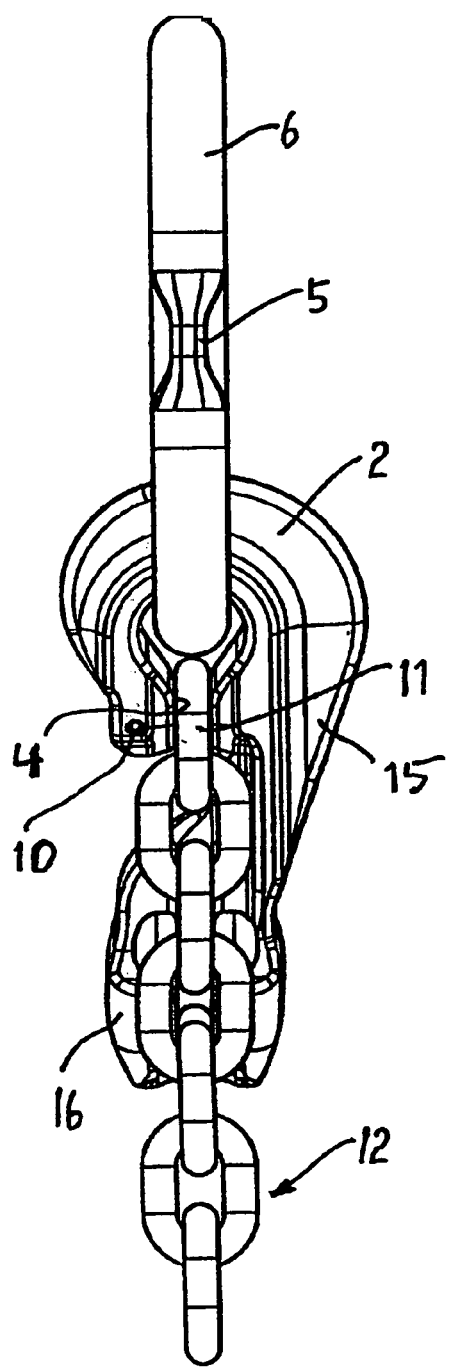
FIG. 9 the front view of a component formed in the manner of a shortening claw with a non-shortened chain FIG. 10 the side view of the component according to FIG. 9
Figure 10:
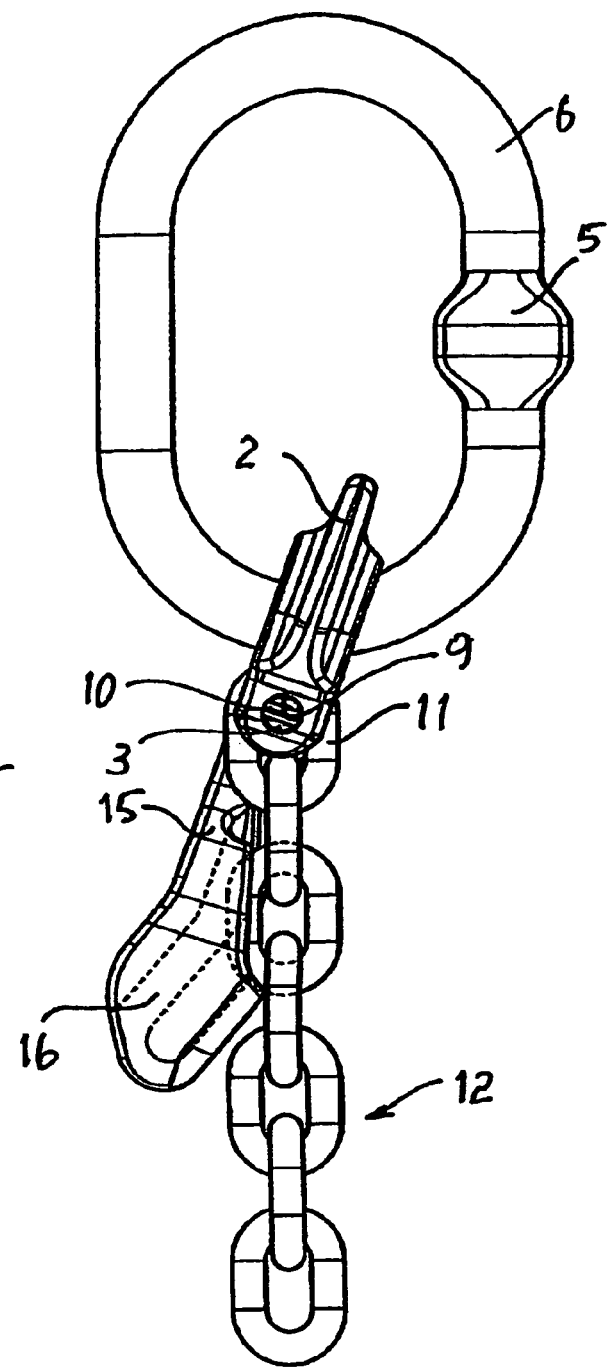
Figure 11:
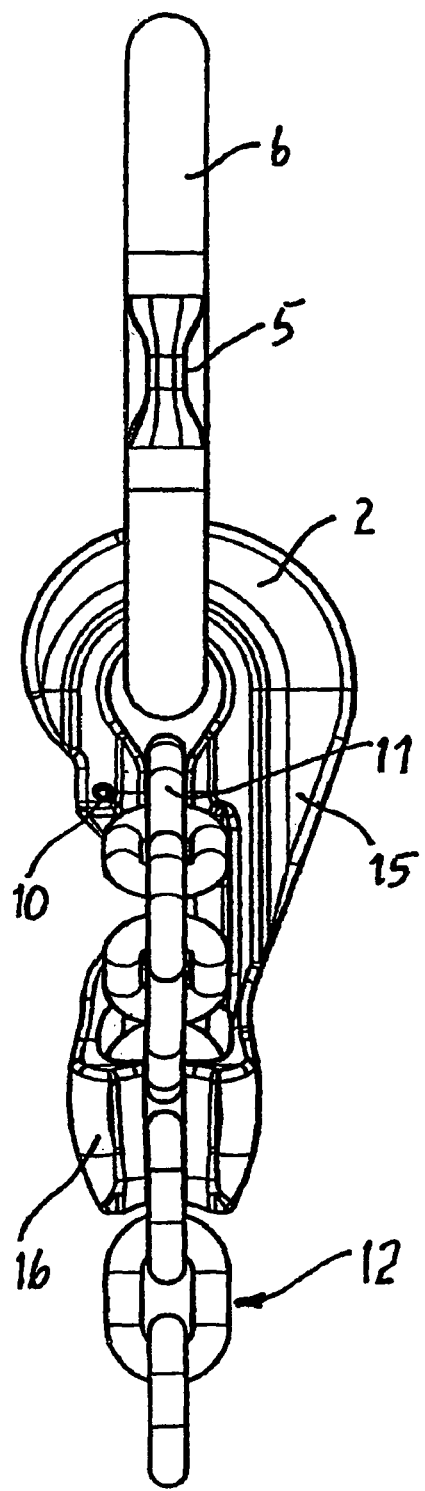
FIG. 11 the front view of the component according to FIGS. 8 and 9, with a minimally shortened chain FIG. 12 the side view of the component according to FIG. 11
Figure 12:
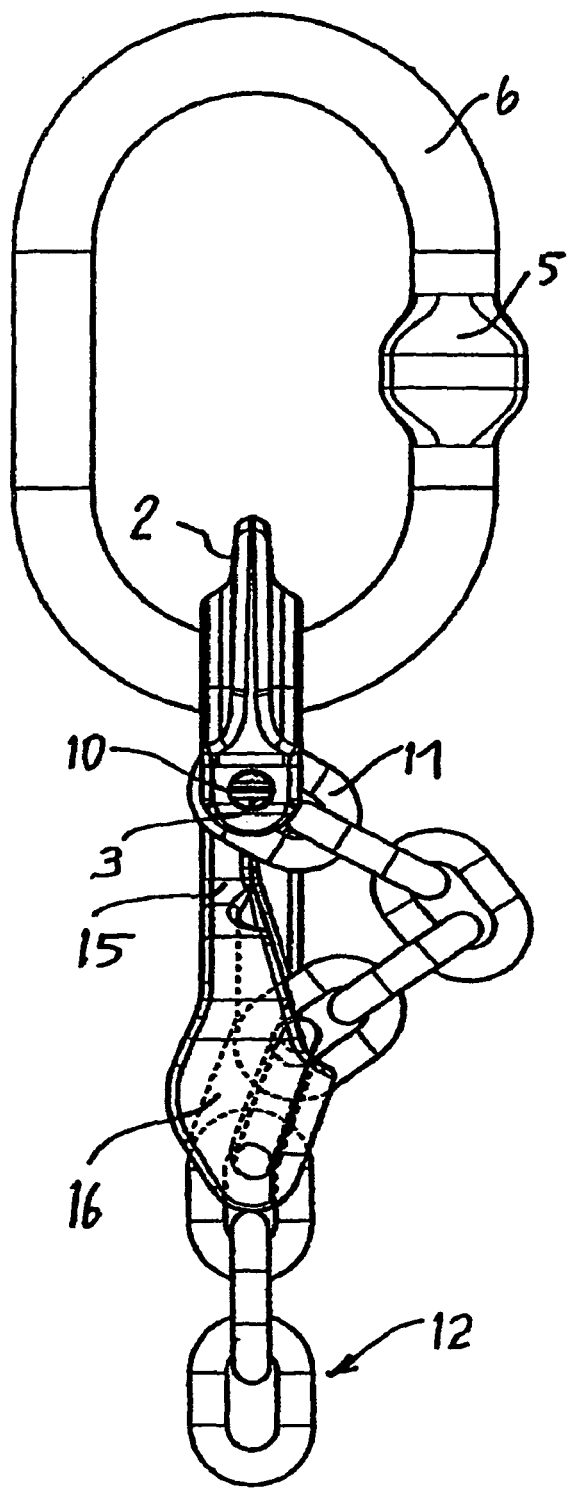

The component shown in FIGS. 1 to 4 and formed in the manner of a shortening hook has a base body 1, whose upper end is formed as a connector bow 2 with an insertion slot 4 that is bridged by a retainer pin 3 and that is for a connector body 6 that is provided with a flat portion 5, while the lower end of the component forms a shortening member 7 consisting of a hook. One end of the retainer pin is held in a blind bore 8, while its other end rests in a through bore 9 that is aligned with the blind bore 8. A spring pin 10 secures the retainer pin 3 in the bore holes 8, 9 which receive the retainer pin. The end link 11 of a chain 12, only a short portion of which is shown in the figures and which is formed from a section of a round steel chain, is connected to the retainer pin 3.

To shorten the chain 12 by the smallest amount possible, it is necessary to form a chain loop, shown in FIG. 3, consisting of a total of 7 links. In practice, this corresponds to a shortening of the chain 12 by an amount in the order of only three times the link division t.

The embodiment according to FIGS. 5 through 8 involves a component whose base body 13 is provided with a shortening organ 14 on its lower end, said shortening organ 14 being formed in a known manner by a bracket equipped with a pull-through opening and a longitudinal slot bounded by support surfaces on the sides, while the design of the upper end corresponds to the design of the upper end of the component according to FIGS. 1 through 4. In this case, again, a retainer pin 3 for the end link 11 of a chain 12 serves to close the insertion slot 4 for the connector body 6 that is provided with a flat portion 5, i.e., here again there is no need for a separate safety bolt. As can be recognized by comparing FIGS. 5 and 6 with FIGS. 7 and 8, the chain 12 in this case can be shortened by a minimum amount that, in fact, corresponds to the order of only twice the division t of the links.

A minimum shortening on the order of twice the division or pitch t of the chain links can also be achieved in the case of the embodiment of the component according to FIGS. 9 through 12, in which the shortening organ 16 arranged at the lower end of a base body 15 is formed as a retainer claw.

The invention claimed is:

1. Component for shortening a chain made of round steel chain links, said component being provided with a connector bow (2) which is adapted to be hung into a connector body (6) provided with a flat portion (5), said connector bow (2) having an insertion opening (4) that is adapted to be closed by a safety bolt, and said component having, on an end of the component lying below the connector bow, a shortening member (7, 14, 16) for shortening the chain (12), whose end link (11) is captively connectable to the component with a retainer pin, whereby the safety bolt is formed as the retainer pin (3) for an end link (11) of the chain (12), said retainer pin (3) being secured against moving, characterised in that the shortening member (7, 14, 16) is arranged on an end of the component lying below the retainer pin (3).

2. Component according to claim 1, characterised in that the distance between the retainer pin (3) and the shortening member (7, 14, 16) arranged below the retainer pin (3) corresponds to at least four times a division t of the links of the chain (12).

3. Component according to claim 1, characterised in that one end of the retainer pin (3) is held in a blind bore (8) and an other end of the retainer pin (3) is held in a through bore (9) adapted to be closed by a spring pin (10).

4. Component according to claim 1, characterised in that the shortening member (7) is formed as a hook.

5. Component according to claim 1, characterised in that the shortening member (14) is formed as a bracket.

6. Component according to claim 1, characterised in that the shortening member (16) is formed as a claw.

7. Component according to claim 2, characterised in that one end of the retainer pin (3) is held in a blind bore (8) and an other end of the retainer pin (3) is held in a through bore (9) adapted to be closed by a spring pin (10).

8. Component according to claim 2, characterised in that the shortening member (7) is formed as a hook.

9. Component according to claim 3, characterised in that the shortening member (7) is formed as a hook.

10. Component according to claim 2, characterised in that the shortening member (14) is formed as a bracket.

11. Component according to claim 3, characterised in that the shortening member (14) is formed as a bracket.

12. Component according to claim 2, characterised in that the shortening member (16) is formed as a claw.

13. Component according to claim 3, characterised in that the shortening member (16) is formed as a claw.

14. Component according to claim 7, characterised in that the shortening member (7) is formed as a hook.

15. Component according to claim 7, characterised in that the shortening member (14) is formed as a bracket.

16. Component according to claim 7, characterised in that the shortening member (16) is formed as a claw.

17. Component for shortening a chain made out of round steel chain links, said component comprising and upper end, which is provided with a connector bow adapted to be hung into a connector body provided with a flat portion, said connector bow having an insertion opening that is adapted to be closed by a safety bolt, and said component comprising a lower end having a shortening member for shortening the chain, whose end link is captively connectable to the component with a retainer pin, which shortening member is arranged below the connector bow, wherein the safety bolt is formed as the retainer pin for the end link, which retainer pin is secured against displacement, and wherein the shortening member is arranged at the lower end of the component below the retainer pin which is formed as the safety bolt.

* * * * *

UNITED STATES PATENT AND TRADEMARK OFFICE
CERTIFICATE OF CORRECTION

| | | |
|---|---|---|
| PATENT NO. | : 8,220,244 B2 | Page 1 of 1 |
| APPLICATION NO. | : 11/919153 | |
| DATED | : July 17, 2012 | |
| INVENTOR(S) | : Reinhard Smetz | |

It is certified that error appears in the above-identified patent and that said Letters Patent is hereby corrected as shown below:

IN THE CLAIMS:

Column 4, Line 18 (Claim 17, Line 2): Delete "and" and substitute --an--.

Signed and Sealed this
Fourth Day of September, 2012

David J. Kappos
*Director of the United States Patent and Trademark Office*